(12) United States Patent
Sundaram (10) Patent No.: US 10,148,365 B2
(45) Date of Patent: Dec. 4, 2018

(54) HYBRID FREE AIR AND ELECTRICAL INTERCONNECT

(71) Applicant: Intel Corporation, Santa Clara, CA (US)

(72) Inventor: Arvind Sundaram, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/476,651

(22) Filed: Mar. 31, 2017

(65) Prior Publication Data

US 2018/0191449 A1    Jul. 5, 2018

Related U.S. Application Data

(60) Provisional application No. 62/442,950, filed on Jan. 5, 2017.

(51) Int. Cl.
*H04B 10/11* (2013.01)
*H04B 10/80* (2013.01)

(52) U.S. Cl.
CPC .......... *H04B 10/801* (2013.01); *H04B 10/11* (2013.01)

(58) Field of Classification Search
CPC .............................. H04B 10/801; H04B 10/11
See application file for complete search history.

(56) References Cited

U.S. PATENT DOCUMENTS

| 2004/0004745 | A1 | 1/2004 | Bratt et al. | |
| 2006/0034560 | A1 | 2/2006 | Morris et al. | |
| 2006/0062269 | A1* | 3/2006 | Shimonaka | B82Y 20/00 372/43.01 |
| 2008/0285970 | A1* | 11/2008 | Shake | H04B 10/07953 398/27 |
| 2012/0039562 | A1 | 2/2012 | Tan et al. | |
| 2014/0270655 | A1 | 9/2014 | Lee et al. | |
| 2015/0295644 | A1* | 10/2015 | Zhou | H04B 10/11 398/115 |
| 2016/0087726 | A1 | 3/2016 | Roberds et al. | |
| 2017/0010426 | A1* | 1/2017 | Isenhour | G02B 6/4214 |

OTHER PUBLICATIONS

"International Application Serial No. PCT/US2018/012349, International Search Report dated Apr. 23, 2018", 3 pgs.
"International Application Serial No. PCT/US2018/012349, Written Opinion dated Apr. 23, 2018", 6 pgs.

\* cited by examiner

*Primary Examiner* — David Payne
*Assistant Examiner* — Omar S Ismail
(74) *Attorney, Agent, or Firm* — Schwegman Lundberg & Woessner, P.A.

(57) ABSTRACT

A communication interface apparatus can include a free-air optical transceiver for communicating signals at a first speed and an electrical contact for communicating at least one of: signals at a second speed or power. The communication interface can include a substrate having a plurality of electrical circuits. The optical transceiver can be electrically coupled to the substrate and configured to transceive an optical signal in free air. In an example, the optical transceiver can convert the optical signal to the signal at the first speed, such as an electrical signal. In an example, the electrical contact can be communicatively coupled to the substrate. The electrical contact and the free-air optical transceiver can be attached to the substrate in fixed relation with respect to one another.

20 Claims, 4 Drawing Sheets

HYBRID FREE AIR AND ELECTRICAL INTERCONNECT

CLAIM OF PRIORITY

This patent application claims the benefit of priority of U.S. Provisional Patent Application Ser. No. 62/442,950, entitled "HYBRID FREE AIR AND ELECTRICAL INTERCONNECT," filed on Jan. 5, 2017, which is hereby incorporated by reference herein in its entirety.

TECHNICAL FIELD

This document pertains generally, but not by way of limitation, to wireless interconnect devices, such as optical interconnections between electronic devices.

BACKGROUND

Electronic systems often include electronic devices that communicate signals to each other. Designers of electronic systems strive to increase the speed of the communication among devices while keeping the communication link robust. Wireless interfaces typically communicate using radio frequency (RF) signals. However, some limitations of RF communication interfaces include bandwidth limitations, signal interference, and overhead associated with RF protocols. Optical signals can be an alternative to RF and can achieve higher data rates. However, traditional optical interconnects require special fiber-optic cables, which can be more expensive than wired interfaces, and can require air tight glass-to-glass connections to prevent Fresnel reflections, making them less desirable and, in certain examples, impractical for day-to-day free-air interconnects. Further, transmitting power over RF and optical interconnects can be challenging for some applications. In some examples, optical transmission protocols can operate at threshold speeds in excess of some low-speed signals used to communicate between electronic devices. There is a general need for devices, systems and methods to address requirements for high-speed interconnections as well as the power and low-speed signal transmission among electronic devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present application relates to devices and techniques for communicating between electronic devices or between two or more components of an electronic device, such as transmitting high-speed, low-speed, or power signals between electronic devices or between various logic, memory, or power transmission components of an electronic device. The following detailed description and examples are illustrative of the subject matter disclosed herein; however, the subject matter disclosed is not limited to the following description and examples provided. Portions and features of some embodiments may be included in, or substituted for, those of other embodiments. Embodiments set forth in the claims encompass all available equivalents of those claims.

The present inventors have recognized, among other things, that a problem to be solved can include providing a robust communications interface that is reliable and cost effective to transceive power, low-speed signals, or high-speed signals between electronic devices or between components of electronic devices. With increasing circuit speeds and decreasing board sizes, smaller contacts as well as the proximity between parallel contacts can be problematic for transporting high speed signals and mitigating electrical interference. For instance, the signal speed that can be transmitted through many electrical connectors can be limited by the geometry of the contacts. Where space is limited, the size of the contacts can be small, and consequently, the signal speed through the contact can be impeded. Electrical connectors can also be susceptible to electric shock, inductive coupling, impedance mismatch, or the like. Radio frequency (RF) transmitters often operate within a specified bandwidth. However, bandwidth can be limited due to regulations or can be allocated to transmit other signals. Additionally, RF transmissions can be susceptible to interference, such as electromagnetic interference (EMI), radio frequency interference (RFI), or the like. A faster alternative is desired to transport high-speed signals, such as between boards or between electronic devices, as well as low-speed signals and power.

As such, it is desirable to implement a wireless communication interface that can provide improved data rate and can adapt basic wireless interconnection with existing protocols (e.g., universal serial bus (USB), mobile industry processor interface (MIPI), peripheral component interconnect (PCI), PCI express (PCIe), high definition multimedia interface (HDMI), Thunderbolt (TBT), display port (DP), or other serial busses and serial-parallel busses used in consumer electronics, enterprise class devices, wearable electronic devices, portable computers, or tablet computers), yet not be tied to any one specific protocol. An infrared-based (IR-based) interface is an alternative to an RF interface, but an IR-based interface involves conversion between protocols, which adds overhead to the communication. A laser-based optical transceiver requiring a fiber-optic cable or interconnect can meet these requirements for the interconnection, but the cost of fiber-optic based optical interconnections, as well as the high power and strict connection requirements for high noise immunity, can be prohibitive.

Providing for the transmission of physical layers communication or power transmission is also desired for the communications interface. For instance, a communications interface is desired that can transmit or receive power between devices and communicate physical layer signals, such as general purpose input/output (GPIO), configuration channel (CC), system management bus (SMB), sideband signals, or the like.

The present subject matter can provide a solution to this problem, such as by providing a laser-based optical transceiver for communicating high-speed signals and including at least one electrical contact for communicating lower-speed signals and power. For instance, the optical transceiver can communicate high-speed signals, low-speed signals, and power between electronic devices or between components of an electronic device. The laser-based optical transceiver can transmit and receive laser emitted signals via free air space (e.g., a light amplitude modulation docking adapter, or LAMDA). This can be accomplished by communicating the optical signals over short distances (e.g., about ten millimeters, or 10 mm) so that signal loss is tolerable. The free air optical transceiver can scale to data rates up to ten gigabits per second (10 Gbps) and rates of one terabit per second (1 Tbps) may be available. This type of optical transceiver is not tied to any specific protocol and eliminates protocol overhead, which reduces the latency in communication to near zero latency. Further, this type of optical transceiver is agnostic to clock rate, making the interface compatible with high-speed and low-speed interfaces. Accordingly, the need for a retimer is reduced or eliminated.

From a user perspective, the learning curve is insignificant, as the free-air optical interconnects disclosed herein look and behave the same as existing, common connectors, with the advantage of high-speed free-space optical interconnection. From a manufacturing perspective, a clean room environment is not required for production of such interfaces, reducing the cost of production. Further, laser product level Class 1 certification is also achievable, as the small free-air interconnects disclosed herein (e.g., 0.8 mm×0.6 mm×0.2 mm, etc.) can be embedded deep inside a connector, and can be suitable for any size, even wearable, devices. The LAMDA interface disclosed herein can further enable routing high speed signals in large systems, such as all-in-one (AIO) systems, or across docking components, in the case of laptops, tablets, phones, or convertibles. Moreover, such free-air communication can provide a secure interface for data transfer, more secure than Thunderbolt (TBT), peripheral component interconnect (PCI), PCI-Express (PCIe), RF, or other interconnects.

The electrical contact can be operatively coupled to the optical transceiver package. Accordingly, assembly tolerances can be minimized and a small overall size can be provided in small, easy to dock package. In an example, the electrical contact can be used to transmit power to another device. In further examples, the electrical contact can communicate data signals, such as low-speed signals (e.g., lower speed than the optical signals). For instance, the electrical contact can communicate biphase mark code (BMC), physical layer signals, general purpose input/output (GPIO), configuration channel (CC), system management bus (SMB), sideband signals, or the like. In various examples, the electrical contact can be used to communicate which signals are transmitted through the optical transceiver and which signals are communicated through the electrical contact. Accordingly, the combination of the electrical contact and the optical transceiver can be used to transmit full USB Type-C communications, mobile industry processor interface (MIPI), peripheral component interconnect (PCI), PCI express (PCIe). Thunderbolt (TBT), serial peripheral interface bus (SPI), inter-integrated circuit (IIC), high-definition multimedia interface (HDMI), universal serial bus (USB), display port (DP), or other protocols, yet is not restricted to any one specific protocol.

Due to the free-air transmission of high-speed signals, a hermetically sealed communication interface for transceiving signals is now a possibility as the optical transmitter and receiver can be sealed into a housing by a lens or a connector body. Furthermore, the bit-to-bit cost of data communication is also cheaper than RF counterparts. For example, using full duplex communication at full speed, the LAMDA interconnects and communications systems and methods can require only 80 mW for a 20 Gbps system, compared to 300 mW for a USB 3.0 repeater. Consequently, the LAMDA interconnect disclosed herein represents a significant power savings.

Accordingly, the communication interface including the optical transceiver and at least one electrical connector as described herein can be used as a replacement for many mechanical docking connectors. In various examples, the communication interface can be used as any type of signal connector, such as any type of device to device or component to component connector, such as a backplane connector, wire-to-board connector, board-to-board connector, flexible circuit connector, or the like. In addition, the optical transceiver can provide high speed signal transmission with low interference (e.g., high signal integrity).

Figure 1:
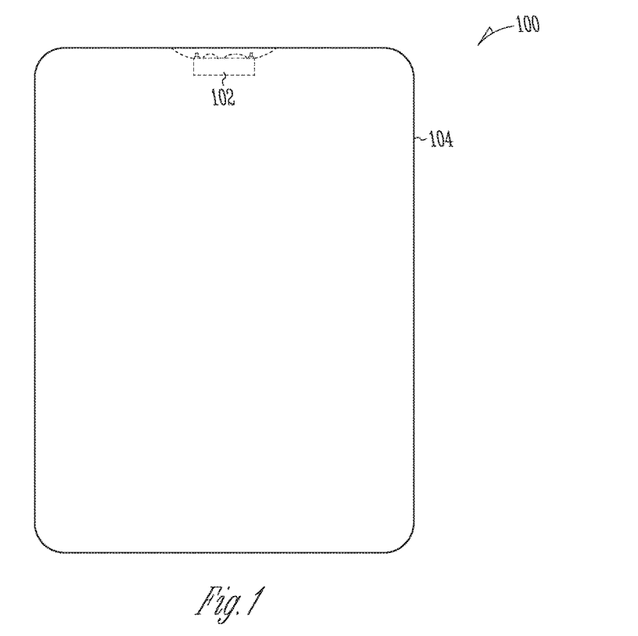
FIG. 1 illustrates an example of an electronic device including a communication interface, according to an embodiment.

FIG. 1 depicts an electronic device 100 including a communication interface 102, according to an embodiment. The electronic device 100 can include, but is not limited to, a mobile phone, tablet, personal computer, peripheral, portable music player, or the like. For instance, the electronic device 100 can include one or more electrical circuits. The one or more electrical circuits can include a processor, memory, display, antenna, camera, speaker, microphone, sensor, graphical user interface (GUI), other input device, input-output (I/O) connector, battery, other power source, or the like. The communication interface can be electrically coupled with the one or more electrical circuits. The communication interface 102 can be configured to transceive electrical signals (e.g., electrically or optically) between the one or more electrical circuits and other electronic devices. For instance, the communication interface 102 can be a docking connector for the electronic device 100. In the example of FIG. 1, the communication interface 102 can be coupled to a housing 104 of the electronic device 100. In some examples, the communication interface 102 can be sealed, such as hermetically sealed to the housing 104 of the electronic device 100. As shown, the communication interface 102 can be recessed or partially recessed within the housing 104 of the electronic device 100. Thus, the communication interface 102 can be shielded and protected within the electronic device 100.

Figure 2:
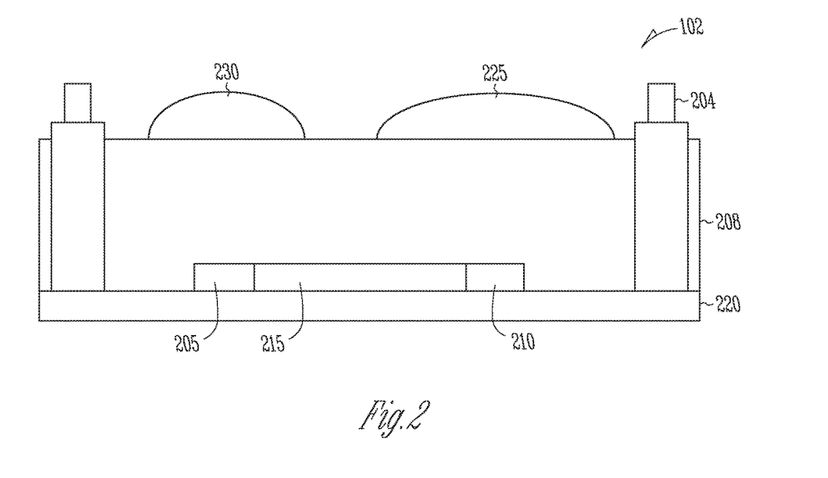
FIG. 2 is a perspective view of a communication interface including a free-air optical transceiver and an electrical contact, according to an embodiment.

FIG. 2 is a perspective view of an example of a communication interface 102 having a free-air optical transceiver (e.g., optical interface) and an electrical contact, such as electrical contact 204 as shown. The communication interface 102 can include, the optical transceiver, the electrical contact 204, a substrate 220, and a connector body 208 (e.g., a housing of the communication interface). In the example of FIG. 2, the optical transceiver can include an optical transmitter and receiver pair (TX/RX pair) as described further herein. The optical transceiver can be operatively coupled (e.g., electrically coupled) to the substrate 220. The connector body 208 can be located on the substrate 220. For instance, the connector body 208 can be formed (e.g., molded) on to the substrate 220. The connector body 208 can be constructed from a material including, but not limited to, a polymer, crystalline material, or the like. For instance, in the example of FIG. 2, the connector body 208 can include an optically clear resin (OCR). In an example, the connector body 208 can be injection molded (e.g., insert molded) over the TX/RX pair and on to the substrate 220. In a further example, the connector body 208 can be formed prior to assembly with the substrate 220. In an example, a lens, such as a lens 225 or a lens 230, can be coupled to the connector body 208. For instance, the lens can be positioned over the TX/RX pair. In a further example, the lens can be integrated into the connector body 208, such as molded into the connector body 208. The optical transceiver can communicate through the lens. In an example, the lenses 225, 230 may be epoxy molded lenses.

The electrical contact 204 can include a spring contact, spring probe, electrical lead, probe, wipe-style contact, or other conductive contact. For instance, the electrical contact 204 can be constructed from a conductive material including, but not limited to, copper, steel, aluminum, silver, gold, or the like. In the example of FIG. 2, the communication interface 102 include four electrical contacts that are spring probes (e.g., pogo pin). The number of electrical contacts can be application specific. For instance, USB Type-C connections can use four electrical contacts as shown. The electrical contact 204 can be electrically coupled to the substrate 220 for communicating with an electronic device (as described further in herein). As shown in the example, of FIG. 2, the communication interface 102 can include four electrical contacts, such as electrical contact 204. In an example, the electrical contact 204 and the optical transceiver can be attached to the substrate 220 in fixed relation with respect to one another. Because the electrical contact 204 is coupled directly to the substrate 220 (e.g., in fixed relation to the optical transceiver), the positional tolerance (e.g., assembly tolerance) between a center of the optical transceiver and the electrical contact 204 can be reduced. Accordingly, this reduction in positional tolerance can reduce alignment issues for the optical transceiver. For instance, transmit TX and receive RX pairs of the optical transceiver (shown and described further herein) can, in some examples, require alignment tolerances of less than 1.0 mm, 0.75 mm, 0.50 mm or the like. In a further example, the electrical contact 204 can be mechanically supported by the connector body 208. For instance, the electrical contact 204 can be located within an aperture in the connector body 208. Thus, the connector body 208 can support the electrical contact 204 and increase the robustness of the communication interface 102.

The substrate 220 can include a printed circuit board or silicon wafer having one or more routing layers for communicating electrical signals. For instance, the routing layers can be arranged as one or more electrical circuits for communicating between the electronic device and the optical transceiver or the electrical contact 204. Some examples of the substrate 220 include a printed circuit board (PCB) made of plastic, plastic laminate (e.g., FR4) or ceramic. In an example, the substrate 220 can be constructed of FR4 with patterned copper routing layers.

The optical TX/RX pair can include an optical transmitter, such as a laser emitter 205. In some examples, the laser emitter 205 can include a laser diode or a vertical-cavity surface emitting laser (VCSEL). The optical receiver can include a photodiode 210 to convert received laser energy into an electrical signal. When laser light falls on the photodiode 210, it produces a photo diode current. The current produced is proportional to the amount of laser light incident on the photodiode 210. When the laser light is modulated, the photodiode current varies with the intensity of the incident laser light. Data is received by detecting the laser modulation using the photodiode current.

A trans-impedance amplifier 215 (TIA) can be used to amplify the electrical signals generated by the photodiode 210. In some examples, the TIA provides an average of the photodiode current generated by the photodiode 210. The laser emitter 205, the photodiode 210 and the TIA 215 are arranged on the substrate 220. For instance, the TX/RX pair can be electrically coupled to one or more routing layers (e.g., electronic circuits) of the substrate 220, such as wire bonded to the one or more routing layers. In certain embodiments, the substrate 220 is an electronics package substrate and the laser emitter 205, the photodiode 210, and the electronic circuits may be included in the same electronics package.

Figure 4:
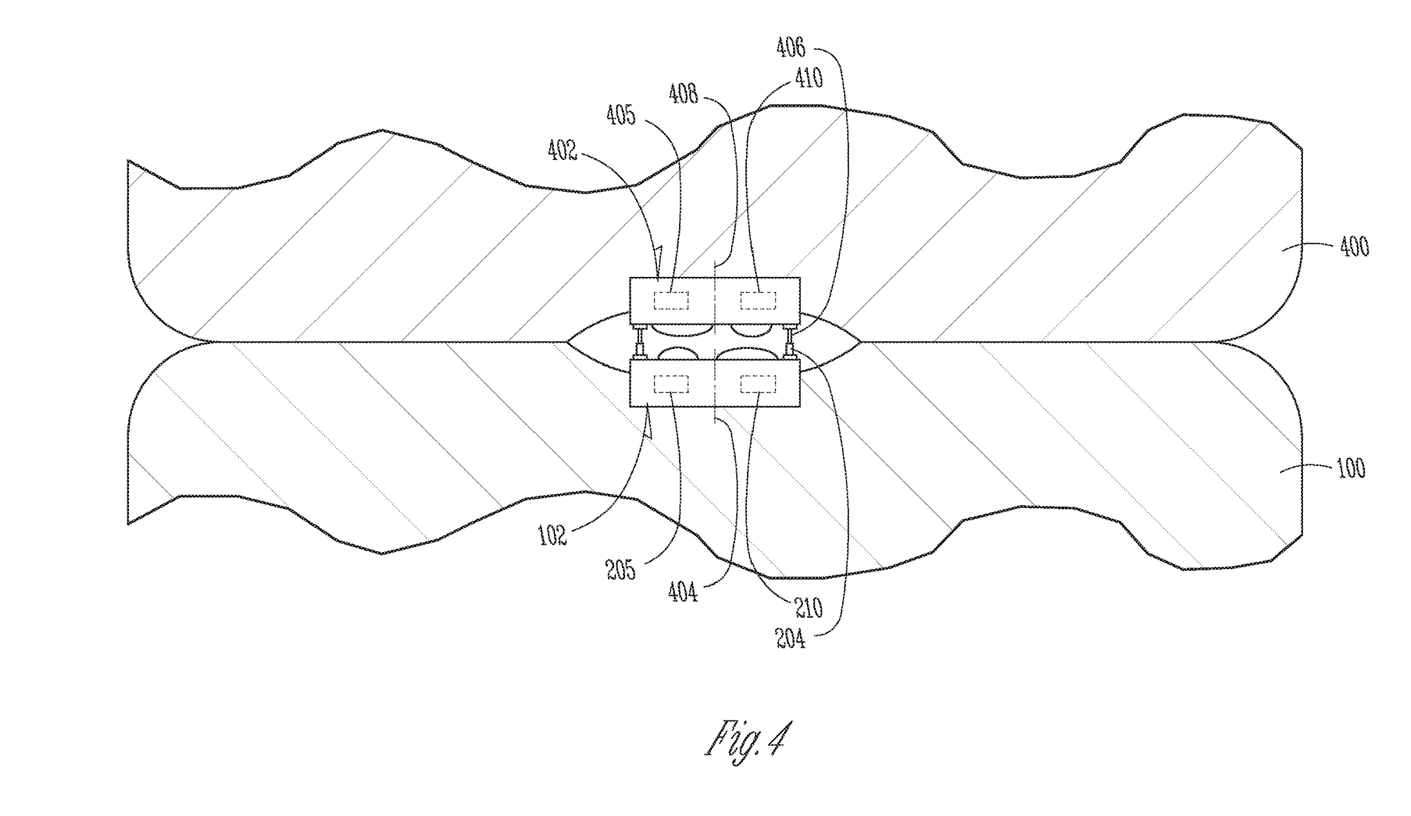
FIG. 4 is an example of a first communication interface docked with a second communications interface, according to an embodiment.

To form a serial duplex optical transceiver, a second optical TX/RX pair can be positioned opposite the optical TX/RX pair (e.g., as shown in FIG. 4). The laser emitter 205 of the second optical TX/RX pair is arranged opposite the optical receiver of the first optical TX/RX pair to create a first communication lane, and the laser emitter 205 of the first optical TX/RX pair is arranged opposite the optical receiver of the second TX/RX pair to form a second communication lane in the reverse direction from the first communication lane. An air gap separates the two TX/RX pairs. The separation between the two optical TX/RX pairs is small (e.g., about 2.5 mm). The small separation allows for the receivers to reliably detect the laser energy from the laser emitter 205. The TX/RX pair can include the lens 225 to focus incident laser energy onto the photodiode 210. The TX/RX pair may also include the second lens 230 to focus the emitted laser energy toward the receiving photodiode across the air gap.

Figure 3:
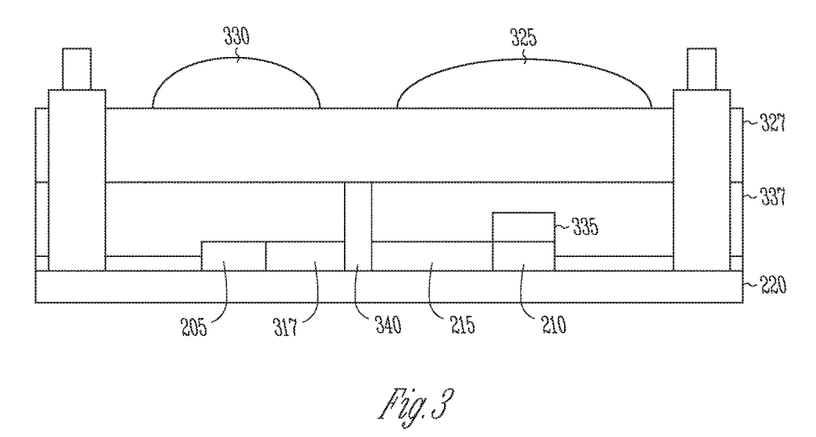
FIG. 3 illustrates a further example of a communication interface, according to an embodiment.

FIG. 3 is an illustration of another embodiment of an optical transmitter TX/RX pair 300. The trans-impedance amplifier 215 (TIA) can be used to amplify the electrical signal generated by the photodiode 210. A drive amplifier 317 may also be included to translate signals to be transmitted to levels of power or voltage needed to drive the laser emitter 205.

In the example of FIG. 3, the connector body can include a resin 337 disposed on the substrate 220 to encapsulate the electronics. The resin 337 may be an optically clear resin (OCR) that flows before hardening. However, OCR may be susceptible to scratching. Because the optical transceiver is exposed to air rather than being protected using connections to fiber-optics, the optical TX/RX pair, such as TX/RX pair 300 may need a surface with a higher degree of hardness than a resin can provide.

The communication interface 300 may include a lens 327. The lens may have a surface hardness rating of 8H or higher. The lens 327 can include a first lens portion (e.g., lens 325) having a first curvature arranged above the photodiode 210 and a second lens portion (e.g., lens 330) having a second curvature arranged above the laser emitter 205. The lens 327 may be pre-formed prior to assembly and may include alumina silicate glass or a co-polymer coated poly(methyl methacrylate) (PMMA), such as sol-gel coated PMMA for example. The lens 327 may have the same refractive index as the connector body 208 (e.g., OCR), the lens 325, or the lens 330 to prevent reflections between the various connector body and lens interfaces. The lens 327 or connector body 208 may also provide protection from humidity. As shown in the example of FIG. 3, an isolation barrier 340 may be arranged on the substrate between the laser emitter 205 and the photodiode. The isolation barrier 340 may extend from the substrate to the top surface of the resin and may also serve as a support for the lens during curing of the resin.

In some embodiments, the photodiode 210 has a wide spectral response (e.g., an indium gallium arsenide (InGaAs) photodiode). The wide spectral response is desirable for detection of laser energy transmitted over air, but can cause problems of crosstalk between the two communication lanes. To reduce or eliminate crosstalk between communication lanes, a laser bandpass filter 335 is arranged above the photodiode 210 of each TX/RX pair. In some embodiments, the laser bandpass filter 335 can be a Lyot filter or a dichroic filter arranged above the photodiode 210. In some embodiments, the laser bandpass filter 335 is formed as a coating (e.g., an anti-reflective coating, or ARC) on the photodiode using ion beam sputtering (IBS). In some embodiments, the laser bandpass filter 335 is formed as a coating on the lens 325.

The laser bandpass filter 335 of a TX/RX pair has a passband that excludes the center frequency of the laser energy emitted by the laser emitter 205 of the TX/RX pair, but the passband includes the center frequency of the laser energy emitted by the laser emitter 205 of the communication lane of the photodiode 210. Thus, the laser bandpass filter 335 reduces or eliminates laser energy from one communication lane from being detected by the other communication lane. In some embodiments, the center frequency of a laser emitter 205 is assigned based on whether the laser emitter 205 is included in a host device (e.g., a computing device or a mobile communication device) or a peripheral device (e.g., a disk drive). If a TX/RX pair is included in a host device, the TX/RX pair includes a laser emitter 205 having a first center frequency and a laser bandpass filter, such as laser bandpass filter 235, that excludes the first center frequency. If a TX/RX pair is included in a peripheral device, the TX/RX pair includes a laser emitter having a second center frequency and a laser bandpass filter that excludes the second center frequency and passes the first center frequency. The TX/RX pair of the host device includes a laser bandpass filter that passes the second center frequency. Thus, the passband of the laser bandpass filter may be selected according to whether the TX/RX pair is included in the host device or peripheral device. In further examples, the optical transceiver can provide secure wireless communication between electronic devices, between components of electronic devices, reduced cross talk between high speed signals transmissions, or any combination thereof.

FIG. 4 depicts an example of a first communication interface, such as communication interface 102, docked (e.g., communicatively coupled) with a second communications interface 400, according to an embodiment. As previously discussed, the first communication interface 102 can be coupled to an electronic device 100. The second communication interface 402 can be operatively coupled to a second electronic device 400. In an example, the first communication interface 102 can include a first optical TX/RX pair (e.g., laser emitter 205 and photodiode 201) and at least one electrical contact 204 arranged on a host-side of the optical transceiver (e.g., on the first electronic device 100). The second communication interface can include a second TX/RX pair and at least one second electrical contact 406 arranged on a peripheral-side of the optical transceiver (e.g., on the second electronic device 400). The second TX/RX pair can include a second laser emitter 405 and a second photodiode 410. The second TX/RX pair can be electrically coupled to one or more routing layers (e.g., electrical circuits) of the second electronic device 400. The optical transceiver (e.g., first and second TX/RX pairs) can communicate signals at a first speed (e.g., high speed signals) based on free air optical transmission. For instance, the optical transceiver can achieve data rates of up to 20 Gbps (10 Gbps Rx and 10 Gbps Tx). The optical transceiver can be protocol agnostic. For instance, the optical transceiver can communicate signals without conversion of the incoming protocol. In other words, the optical transceiver does not require translation of the signal for transmission, and accordingly, a retimer is not required. For instance, the optical signal can be transmitted and received from the optical transceiver independently of a clock rate As shown in the example, of FIG. 4, the optical transceivers and the electrical contacts (e.g., 204, 406) can be aligned for communication. The electrical contact 204 can be a spring probe as previously described. In an example, the electrical contact 406 can include a contact pad, such as a fixed conductive contact to provide an electrical connection with the electrical contact 204. In some examples, the contact pad can be flush with a connector body or lens of the second communication interface 402. In other examples, the electrical contacts, such as electrical contact 204 or electrical contact 406, can include other electrical contacts as previously described herein. For instance, the example of FIG. 4, the first communication interface 102 and the second communication interface 402 can each include four electrical contacts 204, 406.

In some examples, the electrical contact, such as electrical contact 204 or electrical contact 406, can communicate power or data signals. For instance, in an example, the electrical contact can communicate signals at a second speed (e.g., lower speed than the signals communicated through the optical transceiver). The second speed signals can include, but are not limited to biphase mark code (BMC), physical layer signals, general purpose input/output (GPIO) signals, configuration channel (CC) signals, system management bus (SMB) signals, sideband signals, or the like. In an example, BMC signals can be transmitted through the electrical contact 204 and the electrical contact 406 to communicate which signals between the electronic devices (e.g., the first electronic device 100 and the second electronic device 400) are to be communicated through the optical transceiver. In various examples, the electronic contact 204 or electrical contact 406, can communicate power signals between 12 volts and 0.1 volts or any voltage therebetween. In one or more examples the electrical contacts (e.g., 204, 406) can communicate power signals at 12 volts, 3.3 volts, or the like.

In some examples, the electrical contact 204 and electrical contact 406 can communicate signals that are incompatible for transmission through the optical transceiver. For instance, CC logic signals can be three-times slower than a signal transmitted through the optical transceiver (e.g., a minimum speed transmissible through the optical transceiver). Where the communication interface (e.g., communication interface 102 or communication interface 402) includes multiple electrical contacts, some electrical contacts (e.g., two) can communicate power, and other electrical contacts can communicate data.

Accordingly, the communication interface, such as communication interface 102 or communication interface 402, can communicate high speed signals and low speed signals. In various examples, the communication interface can transmit various protocol signals through the optical transceiver, electrical contact 204, or both. The various protocols can include, but not limited to, display port (DP), peripheral component interconnect express (PCIe). Thunderbolt (e.g., TBT2), mobile industry processor interface (MIPI), high definition multimedia interface (HDMI), USB (e.g., USB 2, 3, 3.1, Type-C), serial peripheral interface bus (SPI), inter-integrated circuit (IIC), or other protocols, yet is not restricted to any one specific protocol. In a further example, the optical signals can be communicated through the optical transceiver without converting to another protocol. Accordingly, a retimer is not required. Because of the optical transceiver, the high-speed signals can be resistant to interference (e.g., EMI. RFI, or the like) and can communicate at speeds greater than 10 Gbps. In a further example, the optical transceiver can consume a low amount of power, for instance, less than 80 mW for a system communicating at 20 Gbps at full duplex speed. In some examples, the optical transceiver can consume one-sixth the power of a retimer. In a further example, jitter can be reduced in comparison to devices including a retimer by communicating signals through the optical transceiver.

In an example, the communication interface can include a mechanical connector to house the interface and protect against interference from outside sources. The mechanical connector may include first connector body portion and a second connector body portion. The first communication interface 102 can be included in the first connector body portion and the second communication interface 402 can be included in the second connector body portion. Mating the two connector body portions places the TX laser emitter (e.g., the laser emitter 205 or the laser emitter 405) opposite the RX photodiode (e.g., the photodiode 410 or the photodiode 210) across a small air gap or air space to form the communication lanes of the optical transceiver. Data can be sent between devices (e.g., the first electronic device 100 or the second electronic device 400) or between optical links of the optical transceiver by transmitting laser energy via free air. In a further example, the communication interface can transmit or receive data between components of one or more electronic devices, such as between one or more logic (e.g., processing units), memory (e.g., memory modules), user interfaces (e.g., touchscreen, buttons, or switches), or power components (e.g., power supply).

In one example, the communication interface can provide a low-profile connector interface for docking electronic devices. For instance, the communication interface can be smaller than existing mechanical connectors, such as USB 3.0 or the like. In a further example, alignment of the communication interface can be provided by housings of the electronic devices (e.g., housing 104), rather than by the connector itself. Accordingly, robustness of the communication interface can be increased as well as the ease of docking the electronic devices. In a further example, the communication interface can be recessed within the housing of the electronic devices. Thus, the communication interface can be shielded and protected within the electronic device. In a further example, the communication interface can provide cleaner industrial designs for the electronic device and reduce openings into the housing of the electronic device.

Because of an alignment tolerance (window) of the communication interface, the electronic devices or components can be mated with a degree of misalignment (e.g., tilt, rotation, and translation (three-axis of flexibility)) and the communication interface can be operative. For instance, the optical transceiver can be misaligned by up to 1.0 mm. In a further example, where the electrical contacts include spring characteristics, they can provide electrical contact within a range of tilt, translation, or rotation. In an example, a size of the contact pad can be increased to provide more positional tolerance between the electrical contacts. In some examples, an engagement axis 404 of the communication interface 102 and an engagement axis 408 of the mating communication interface 402 are configured to operate at an angular alignment of three-degrees or more. Accordingly, the communication interface can be used as a docking connector for mobile devices, tablets, 2 in 1 computers, or the like. For instance, the accommodation of rotation and translation between electronic devices or components by the communication interface can be useful for various docking applications, such as docking portions of 2 in 1 computers in different arrangements (e.g., tent mode, reading mode, frame mode, clamshell mode, or the like).

Figure 5:
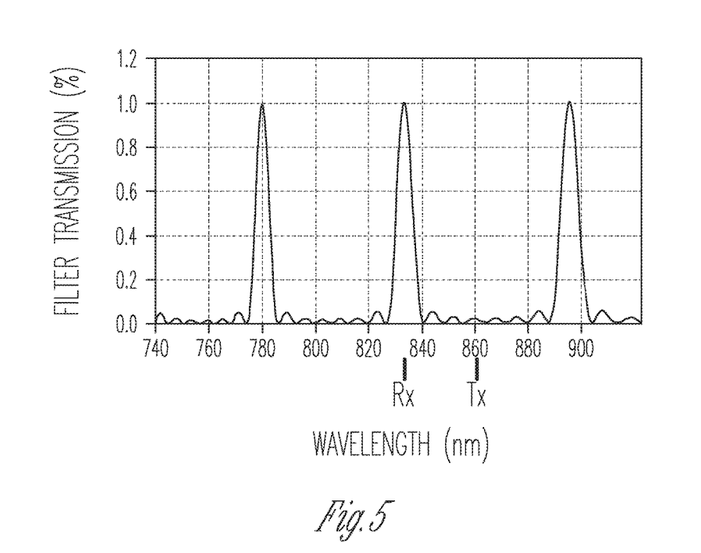
FIG. 5 depicts an example of a filter characteristic for a laser bandpass filter, according to an embodiment.

FIG. 5 is an example of a filter characteristic for a laser bandpass filter. The example is intended to be illustrative and non-limiting. The filter characteristic shows filter transmission versus wavelength. In the example, a host device laser emitter, e.g., laser emitter 205, emits laser energy with a wavelength of 855 nanometers (nm), and a peripheral laser emitter, such as laser emitter 405 emits laser energy with a wavelength of 830 nm. FIG. 5 shows an example of a filter characteristic for the host device. The filter shows very high attenuation at 855 nm and shows that the passband of the filter includes 830 nm.

Figure 6:
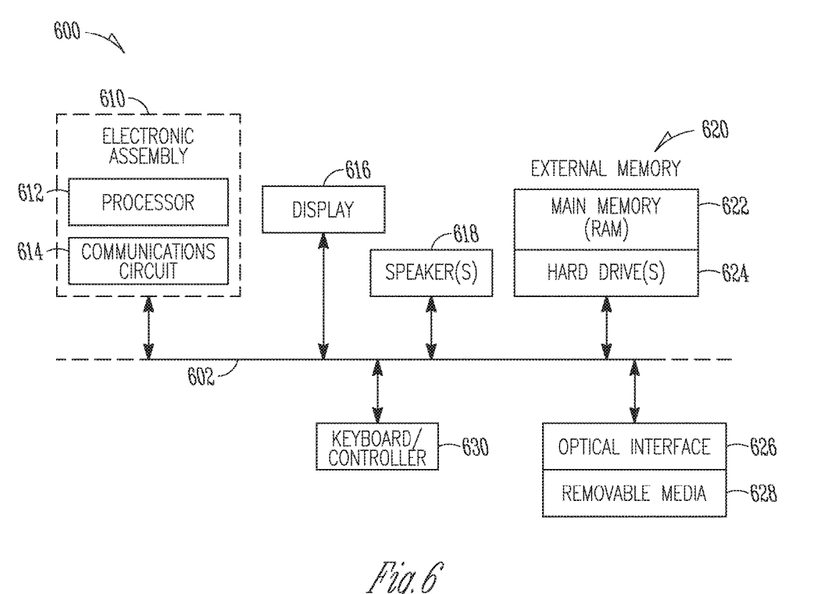
FIG. 6 is block diagram of an example of an electronic device incorporating at least one communication interface, according to an embodiment.

FIG. 6 is a block diagram of an example of an electronic device 600 incorporating at least one communication interface 626 (e.g., including at least one optical transceiver and at least one the electronic contact as previously described herein) in accordance with at least one embodiment of the invention. Electronic device 600 is merely one example in which embodiments of the present invention can be used. Examples of electronic devices 600 include, but are not limited to personal computers, tablet computers, mobile telephones, game devices, compute sticks, mobile devices, memory, peripherals, servers, server components, agnostic backplane connectors, wearable devices, or the like. In this example, electronic device 600 comprises a data processing system that includes a system bus 602 to couple the various components of the system. System bus 602 provides communications links among the various components of the electronic device 600 and can be implemented as a single bus, as a combination of busses, or in any other suitable manner.

An electronic assembly 610 can be coupled to system bus 602. The electronic assembly 610 can include any circuit or combination of circuits. In one embodiment, the electronic assembly 610 includes a processor 612 which can be of any type. As used herein. "processor" means any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, or any other type of processor or processing circuit.

Other types of circuits that can be included in electronic assembly 610 are a custom circuit, an application-specific integrated circuit (ASIC), or the like. The electronic assembly can include a communications circuit 614 for use in wireless devices like mobile telephones, personal data assistants, portable computers, two-way radios, and similar electronic devices.

The electronic device 600 can also include an external memory 620, which in turn can include one or more memory elements suitable to the particular application, such as a main memory 622 in the form of random access memory (RAM), one or more hard drives 624.

The electronic device 600 can also include a display device 616, one or more speakers 618, and a keyboard and/or controller 630, which can include a mouse, trackball, touch screen, voice-recognition device, or any other device that permits a system user to input information into and receive information from the electronic device 600.

Various Notes & Examples

Each of these non-limiting examples can stand on its own, or can be combined in various permutations or combinations with one or more of the other examples. To better illustrate the method and apparatuses disclosed herein, a non-limiting list of embodiments is provided here:

Example 1 is a communication interface apparatus including a substrate having a plurality of electrical circuits to communicate a signal at a first speed and at least one of: a signal at a second speed or power, wherein the second speed is slower than the first speed; a free-air optical transceiver for communicating the signal at the first speed including: an electrical contact communicatively coupled to the substrate to transceive at least one of: the signal at the second speed or power; and wherein the electrical contact and the free-air optical transceiver are attached to the substrate in fixed relation with respect to one another.

In Example 2, the subject matter of Example 1 optionally includes a lens coupled to the substrate and positioned over at least one of the optical receiver and the optical transmitter.

In Example 3, the subject matter of any one or more of Examples 1-2 optionally includes wherein the electrical contact includes a spring probe.

In Example 4, the subject matter of any one or more of Examples 1-3 optionally includes wherein the electrical contact includes a spring contact.

In Example 5, the subject matter of any one or more of Examples 1-4 optionally includes wherein the communication interface can be communicatively coupled with a mating communication interface, an engagement axis of the communication interface and an engagement axis of the mating communication interface are configured to operate at an angular alignment of three-degrees or more.

In Example 6, the subject matter of any one or more of Examples 1-5 optionally includes wherein the electrical contact is configured to transceive electrical power and a second electrical contact is configured to transceive the second speed signal.

In Example 7, the subject matter of any one or more of Examples 1-6 optionally includes a connector body, wherein the connector body is configured to support the electrical connector.

In Example 8, the subject matter of Example 7 optionally includes wherein the connector body is coupled between the substrate and the lens.

In Example 9, the subject matter of any one or more of Examples 1-8 optionally includes a plurality of electrical connectors, wherein the plurality of electrical connectors are electrically coupled to the substrate.

In Example 10, the subject matter of any one or more of Examples 1-9 optionally includes wherein the first optical signal and the second optical signal are transmitted and received independently of a clock rate.

Example 11 is a method of attaching an optical transceiver and an electrical contact to a communications interface, the method including attaching an optical transceiver to a substrate of the communications interface, the optical transceiver including an optical transmitter and an optical receiver pair, wherein the optical transceiver is communicatively coupled to an electrical circuit of a plurality of electrical circuits of the substrate to transceive a signal at a first speed; attaching an electrical contact to the substrate, wherein the electrical connect is communicatively coupled to at least one electrical circuit of the plurality of electrical circuits and configured to communicate at least one of: a signal at a second speed or electrical power; and coupling a lens to the communication interface and positioning the lens over the optical transceiver.

In Example 12, the subject matter of Example 11 optionally includes wherein coupling the lens to the communication interface includes configuring the lens to support the electrical contact.

In Example 13, the subject matter of any one or more of Examples 11-12 optionally includes wherein attaching the electrical contact to the substrate includes attaching a spring probe to the substrate.

In Example 14, the subject matter of any one or more of Examples 11-13 optionally includes wherein attaching the electrical contact to the substrate includes attaching a spring contact to the substrate.

In Example 15, the subject matter of any one or more of Examples 11-14 optionally includes wherein attaching the electrical contact to the substrate includes configuring the electrical contact to transceive electrical power.

In Example 16, the subject matter of any one or more of Examples 11-15 optionally includes attaching a connector body to the substrate, wherein the connector body is configured to support the electrical contact.

In Example 17, the subject matter of Example 16 optionally includes wherein attaching the connector body to the substrate includes coupling the connector body between the substrate and the lens.

In Example 18, the subject matter of any one or more of Examples 11-17 optionally includes attaching a plurality of electrical contacts to the substrate and communicatively coupling the plurality of electrical contacts to respective electrical circuits of the plurality of electrical circuits, wherein at least one of the electrical contacts is configured to communicate electrical power and at least one of the electrical contacts is configured to communicate the signal at the second speed, wherein the second speed is slower than the first speed.

In Example 19, the subject matter of any one or more of Examples 11-18 optionally include configuring the optical transceiver to communicate the signal at the first speed independently of a clock rate.

Example 20 is a communication interface constructed from any one of the method Examples 11-19 for communicatively coupling two or more electronic devices or components.

Example 21 is an electronic system including a communication interface constructed from any one of the method Examples 11-19.

Example 22 is a system including a communication interface, the system including an electronic device having a device housing; a communication interface coupled to the device housing, wherein the communication interface includes: a substrate including a plurality of electrical circuits to communicate a signal at a first speed and at least one of: a signal at a second speed or power, wherein the second speed is slower than the first speed; a free-air optical transceiver for communicating the signal at the first speed; an electrical contact communicatively coupled to the substrate to transceive at least one of: the signal at the second speed or power; and wherein the electrical contact and the free-air optical transceiver are attached to the substrate in fixed relation with respect to one another.

In Example 23, the subject matter of Example 22 optionally includes wherein the communication interface can be communicatively coupled with a mating communication interface of a second electronic device, an engagement axis of the communication interface and an engagement axis of the mating communication interface are configured to operate at an angular alignment of three-degrees or more.

In Example 24, the subject matter of any one or more of Examples 22-23 optionally includes a second electrical contact attached to the substrate, wherein the electrical contact is configured to communicate the signal at the second speed and the second electrical contact is configured to communicate electrical power.

In Example 25, the subject matter of any one or more of Examples 22-24 optionally includes wherein the communication interface is configured to be recessed within the device housing.

Example 26 is an apparatus comprising means for performing any of the operations of Examples 1-25.

Example 27 is a system to perform the operations of any of the Examples 1-25.

Example 28 is a method to perform the operations of any of the Examples 1-25.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A communication interface apparatus comprising:
 a substrate including a plurality of electrical circuits to communicate a first signal at a first speed and at least one of: a second signal at a second speed or power, wherein the second speed is slower than the first speed;
 a free-air optical transceiver for communicating the first signal at the first speed, the free-air optical transceiver including:
 an optical receiver on the substrate and electrically coupled to a first electrical circuit of the plurality of electrical circuits;
 an optical transmitter on the substrate and electrically coupled to a second electrical circuit of the plurality of electrical circuits;
 at least one lens over the optical receiver and the optical transmitter;
 an electrical contact extending from a surface of the substrate beyond a surface of the lens that faces away from the substrate, the electrical contact communicatively coupled to a third electrical circuit of the plurality of electrical circuits, the electrical contact to transceive the at least one of: the signal at the second speed or power; and
 wherein the electrical contact and the free-air optical transceiver are attached to the substrate in fixed relation with respect to one another,
 wherein the communication interface is configured to be communicatively coupled with a mating communication interface, an engagement axis of the communication interface and an engagement axis of the mating communication interface are configured to operate at an angular alignment of three-degrees or more.

2. The apparatus of claim 1, wherein the electrical contact includes a spring probe.

3. The apparatus of claim 1, wherein the electrical contact includes a spring contact.

4. The apparatus of claim 1, wherein the electrical contact is configured to transceive electrical power and a second electrical contact is configured to transceive the second speed signal.

5. The apparatus of claim 1, further comprising a connector body, wherein the connector body is configured to support the electrical contact.

6. The apparatus of claim 5, wherein the connector body is coupled between the substrate and the lens.

7. The apparatus of claim 1, further comprising a plurality of electrical connectors, wherein the plurality of electrical connectors are electrically coupled to the substrate.

8. The apparatus of claim 1, wherein the first signal is a first optical signal and the second signal is a second optical signal, and wherein the first optical signal and the second optical signal are transmitted and received independently of a clock rate.

9. A method of attaching an optical transceiver and an electrical contact to a communications interface, the method comprising:
attaching the optical transceiver to a substrate of the communications interface, the optical transceiver including an optical transmitter and an optical receiver pair, wherein the optical transceiver is communicatively coupled to a first electrical circuit of a plurality of electrical circuits of the substrate to transceive a signal at a first speed;
attaching the electrical contact to the substrate, wherein the electrical contact is communicatively coupled to a second electrical circuit of the plurality of electrical circuits and configured to communicate at least one of: a signal at a second speed or electrical power; and
coupling a lens to the communication interface and positioning the lens over the optical transceiver, the electrical contact extending from a surface of the substrate beyond a surface of the lens, the surface of the lens facing away from the substrate,
wherein the communication interface is configured to be communicatively coupled with a mating communication interface, an engagement axis of the communication interface and an engagement axis of the mating communication interface are configured to operate at an angular alignment of three-degrees or more.

10. The method of claim 9, wherein coupling the lens to the communication interface includes configuring the lens to support the electrical contact.

11. The method of claim 9, wherein attaching the electrical contact to the substrate includes attaching a spring probe to the substrate.

12. The method of claim 9, wherein attaching the electrical contact to the substrate includes attaching a spring contact to the substrate.

13. The method of claim 9, wherein attaching the electrical contact to the substrate includes configuring the electrical contact to transceive electrical power.

14. The method of claim 9, further comprising attaching a connector body to the substrate, wherein the connector body is configured to support the electrical contact.

15. The method of claim 14, wherein attaching the connector body to the substrate includes coupling the connector body between the substrate and the lens.

16. The method of claim 9, further comprising attaching a plurality of electrical contacts to the substrate and communicatively coupling the plurality of electrical contacts to respective electrical circuits of the plurality of electrical circuits, wherein at least one of the electrical contacts is configured to communicate electrical power and at least one of the electrical contacts is configured to communicate the signal at the second speed, wherein the second speed is slower than the first speed.

17. The method of claim 9, further comprising configuring the optical transceiver to communicate the signal at the first speed independently of a clock rate.

18. A system including a communication interface, the system comprising:
an electronic device including a device housing;
the communication interface coupled to the device housing wherein the communication interface includes:
a substrate including a plurality of electrical circuits to communicate a signal at a first speed and at least one of:
a signal at a second speed or power, wherein the second speed is slower than the first speed;
a free-air optical transceiver for communicating the signal at the first speed;
a lens over the free-air optical transceiver;
a first electrical contact communicatively coupled to the substrate to transceive at least one of: the signal at the second speed or power, the electrical contact extending from a surface of the substrate beyond a surface of the lens that faces away from the substrate; and
wherein the electrical contact and the free-air optical transceiver are attached to the substrate in fixed relation with respect to one another,
wherein the communication interface is configured to be communicatively coupled with a mating communication interface of a second electronic device, an engagement axis of the communication interface and an engagement axis of the mating communication interface are configured to operate at an angular alignment of three-degrees or more.

19. The system of claim 18, further comprising a second electrical contact attached to the substrate, wherein the first electrical contact is configured to communicate the signal at the second speed and the second electrical contact is configured to communicate electrical power.

20. The system of claim 18, wherein the communication interface is recessed within the device housing.

* * * * *

UNITED STATES PATENT AND TRADEMARK OFFICE
CERTIFICATE OF CORRECTION

PATENT NO. : 10,148,365 B2  
APPLICATION NO. : 15/476651  
DATED : December 4, 2018  
INVENTOR(S) : Arvind Sundaram Page 1 of 1

It is certified that error appears in the above-identified patent and that said Letters Patent is hereby corrected as shown below:

In the Claims

In Column 16, Line 4, in Claim 14, delete "comp rising" and insert --comprising-- therefor In Column 16, Line 12, in Claim 16, delete "coup ling" and insert --coupling-- therefor In Column 16, Lines 26-27, in Claim 18, after "housing", insert --,--

Signed and Sealed this  
Eleventh Day of January, 2022

Drew Hirshfeld  
*Performing the Functions and Duties of the*  
*Under Secretary of Commerce for Intellectual Property and*  
*Director of the United States Patent and Trademark Office*